J. MAYER.
Springs for Vehicles.

No. 139,801. Patented June 10, 1873.

Witnesses: John J. Bonner, Edward Wilhelm

Jacob Mayer, Inventor
by Jay Hyatt, Atty.

UNITED STATES PATENT OFFICE.

JACOB MAYER, OF ELMER, NEW YORK.

IMPROVEMENT IN SPRINGS FOR VEHICLES.

Specification forming part of Letters Patent No. 139,801, dated June 10, 1873; application filed April 21, 1873.

*To all whom it may concern:*

Be it known that I, JACOB MAYER, of Elmer, in the county of Erie and State of New York, have invented certain Improvements in Springs for Vehicles, of which the following is a specification:

My invention relates to a combined elliptic and torsional spring composed of two similar parts secured respectively to the axle-tree and body of the vehicle.

Figure 1:
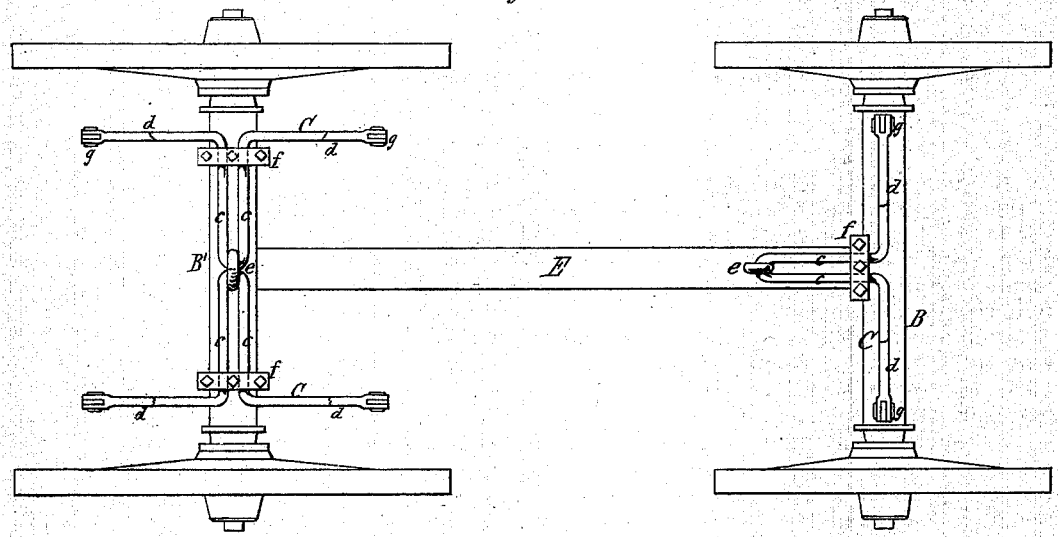
Figure 2:
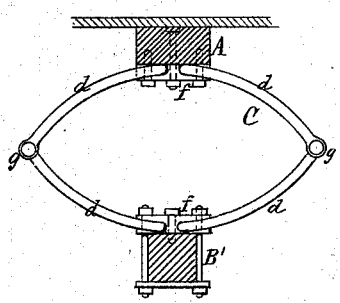
Figure 3:
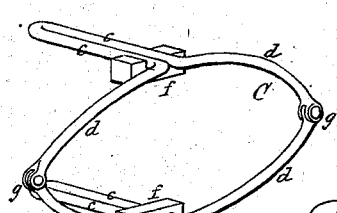

In the accompanying drawing, Figure 1 is a plan view of a vehicle provided with my improved springs. Fig. 2 is a side elevation, and Fig. 3 a perspective view, of one of the springs.

Like letters of reference designate like parts in each of the figures.

A represents the cross or bearing pieces attached to the under side of the body or box of a vehicle, and B B' the front and rear axle-trees thereof. C represents my combined elliptic and torsional spring, composed of an upper and lower half, each constructed of a single steel rod, tube, or other material possessing torsional elasticity. $c\ c$ represent the two torsion-arms of each half of the spring C, formed by bending the central portion of the rod composing the same into an elongated loop, as clearly shown in Figs. 1 and 3. $d\ d$ represent the two yielding or elliptic arms of each half of the spring C, extending from the outer ends of the torsion-arms $c\ c$ outwardly in an inclined direction. Each half of the spring C is secured in place by a staple, $e$, firmly clamping the inner end of the loop or junction of the arms $c\ c$, and two bearings, $f\ f$, holding the outer ends of the arms $c\ c$ against lateral displacement, but allowing of their turning therein. The ends of the arms $d\ d$ of both halves of each spring are united together by bolts $g$, or other suitable means, as usual in elliptic springs. When a single spring is employed with each axle the torsion-arms $c\ c$ of the lower halves are secured to the reach E of the vehicle, as shown at the front axle B in Fig. 1, while when two springs are employed they are secured to the axle as shown at the rear axle B' in the same figure.

When pressure is applied to the spring C the elasticity of the elliptic arms $d\ d$ and torsion-arms $c\ c$ is called into action one after the other, the former flattening out to a certain degree, whereby the latter are twisted more or less, according to the intensity of the strain. In this manner the torsional strain is transmitted more gradually to the arms $c\ c$ than in ordinary torsional springs, which are only provided with short unyielding pressure-arms, transmitting the shock directly and with full force to the torsion-arms. In my improved spring the elliptic arms $d\ d$ allow the body of the vehicle a greater vertical movement with reference to the axles than in ordinary torsional springs, whereby a more easy and pleasant movement of the vehicle-body is insured.

My combined spring is very cheaply constructed as compared with ordinary elliptic springs, and quite as durable and efficient in its operation.

I claim as my invention—

The combined elliptic and torsional spring C, composed of two halves, each consisting of two torsion-arms, $c\ c$, and elliptic arms $d\ d$, constructed to operate substantially as hereinbefore set forth.

JACOB MAYER.

Witnesses:
 JOHN J. BONNER,
 EDWARD WILHELM.